United States Patent [19]

Gilligan

[11] Patent Number: 4,935,817
[45] Date of Patent: Jun. 19, 1990

[54] DUAL MODE ALL - LIGHT LEVEL TELEVISION CAMERA

[75] Inventor: Lawrence H. Gilligan, Charlottesville, Va.

[73] Assignee: Sperry Marine Inc., Charlottesville, Va.

[21] Appl. No.: 289,331

[22] Filed: Dec. 22, 1988

[51] Int. Cl.$^5$ .............................................. H01J 31/50
[52] U.S. Cl. ............................. 358/211; 250/213 VT; 358/228
[58] Field of Search ................. 358/211, 228, 217–219, 358/213.11; 250/213 VT

[56] References Cited

U.S. PATENT DOCUMENTS

| | | | |
|---|---|---|---|
| 3,691,302 | 9/1972 | Gaebele et al. | 358/228 |
| 3,947,119 | 3/1976 | Bamberg et al. | 358/211 |
| 3,974,331 | 8/1976 | Pepin | 358/211 |
| 4,025,955 | 5/1977 | Grallien et al. | 358/211 |
| 4,071,752 | 1/1978 | Manning | 358/211 |
| 4,141,043 | 2/1979 | Liu | 358/228 |
| 4,796,090 | 1/1989 | Fraier | 358/211 |

Primary Examiner—Jin F. Ng
Assistant Examiner—Stephen Brinich

[57] ABSTRACT

An apparatus for automatically controlling the photocathode of an image intensifier employed as a high speed shutter in a television camera utilizes the video signals established by the camera to provide first and second pulses representative of the light level at the camera. The lengths of these pulses are compared to time intervals representative of light levels whereat switching is provided that selects between the first pulse control of the photocathode and control of the photocathode by a train of pulses gated within the time interval of the second pulse.

11 Claims, 3 Drawing Sheets

DUAL MODE ALL - LIGHT LEVEL TELEVISION CAMERA

BACKGROUND OF THE INVENTION

1. Field of the Invention

The invention pertains to automatic light-level control in low-light-level television cameras (LLL/TV) and more particularly to the automatic control of LLL/TV cameras operating in light levels variable from starlight to full daylight.

2. Description of the Prior Art

Automatic light-level control in LLL/TV cameras is a special problem, because the dynamic range of light-levels in nature and the dynamic range of camera sensors differ by six orders of magnitude. Since the development of LLL/TV in the mid-1960's the dual problems of photocathode protection and image quality over a wide dynamic range of light levels has existed. A camera devised with a sensitivity that allows image perception by starlight (approximately $10^{-5}$ lux) is expected by users to be functional at any light level. Typically, however, the sensors involved begin to saturate and produce poor images at light levels 100 times above maximum sensitivity. Additionally, the sensors incur permanent damage at light levels above $10^{-2}$ lux.

A light level control that permits use of LLL/TV sensors at all light levels automatically has been needed from the advent of LLL/TV in 1963. Many light control systems have been developed to provide automatic light control for LLL/TV cameras. Most of these systems, however, have exhibited limited dynamic range, insufficient operating speed, low reliability, or extreme complexity. One device of the prior art utilizes a motor driven servo to control a lens iris. The aperture size that may practically be provided by an iris is between F/0.9 to F/32, which represents a dynamic range of 1200 to 1, a range that is inadequate for light level variations from starlight to maximum daylight, a range of $10^9$ to 1. Additionally, a motor driven iris is too slow and does not exhibit sufficient reliability for use in environments where light levels change rapidly.

An attempt to provide a more suitable motor driven iris utilizes a neutral density filter spot within the center of the iris. This configuration permits a more rapid variation of the lens aperture, for as the iris closes down more of the aperture is occupied by the spot. Though the dynamic range is increased to $10^6$-to-1 it is still inadequate and the speed problems still remain, while additional optical problems are introduced. This technique has been utilized with stepped neutral density filters with which dynamic range requirements may be met. These filters, however, are expensive and the stepped functions between filters introduce severe control problems and increase reliability problems due to the additional mechanical complexity.

The best solution to the problem implemented in the prior art utilizes neutral density wedge filters which close down and open the aperture in accordance with the incident light level. This system exhibits a dynamic range of $10^8$-to-1 and the speed of the aperture size variation is adequate. The assembly, however, of such a system is complex, large, and requires expensive optical components.

Though limited in dynamic range, pulse-width modulated gating of the light input by means of an electronic shutter is the most satisfactory of the prior art systems. Such a system provides $10^6$-to-1 dynamic range with acceptable speed, reliability, and cost.

As previously indicated, the light level incident to a LLL/TV sensor may be controlled by either controlling the total light level or by modulating the duty factor of the light entering the sensor. Most prior art systems utilize total light level control, which introduce undesirable optical problems and exhibit speed and reliability deficiencies. Additionally, these systems function by changing the total incoming light level to the sensor and may, therefore, smear a moving scene during the frame time of the camera. Though many of these deficiencies are overcome with the utilization of a pulse-width modulating gating as described in U.S. Pat. No. 4,202,014 having the same inventor and assignee as the present invention, these systems do not provide sufficient dynamic range to permit operation of the LLL/TV cameras in environments that vary from starlight to daylight.

SUMMARY OF THE INVENTION

The present invention provides a time domain light-level control that utilizes a dual loop electronic shutter. A first loop provides a first pulse having a width that is variable as an inverse function of the light level. This first pulse gates the photocathode of an image intensifier, which acts as a shutter for the camera, to provide an on-time equal to the pulse duration, that is a fraction of each TV frame time interval. Since the photocathode is insensitive to light during the off-time, the gating effectively provides an exposure time which is a function of the incident light level.

A mode selection switch with an electronic hysteresis, selects the variable light pulse loop to control the on-time of the photocathode when the incident light is below a predetermined level. Should the incident light be above this level, the mode selector switches from the variable light pulse width loop to a gated pulse loop. This loop provides pulses at a predetermined repetitive rate that have a constant and much shorter duration than that of the variable width pulse. Each pulse of constant width triggers the photocathode on, the photocathode remaining in the on-mode for the duration of the pulse. The number of constant width pulses so acting on the photocathode is determined by the width of a second variable width pulse, which is also a inverse function of the light. Thus, the combination of the variable width pulses and the constant width pulses control the response of the photo cathode to the incident light in accordance with the incident light level.

Further aspects and advantages of the present invention will be apparent from the following description of the preferred embodiments of the invention and the accompanying drawings.

DESCRIPTION OF THE PREFERRED EMBODIMENT

Figure 1:
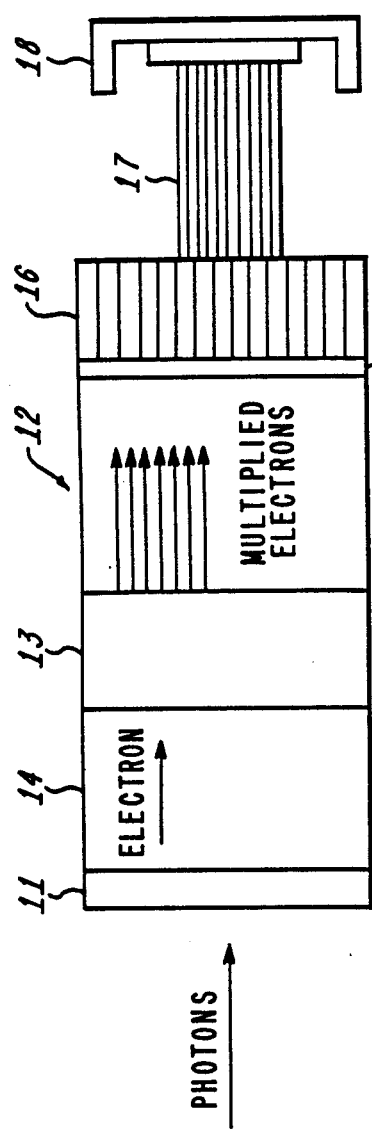
FIG. 1 is a schematic diagram of an image intensifier coupled to a focal plane array via a fiber optic image relay.

The response of the photocathode in an image intensifier to an applied electrical potential permits its use as a high speed shutter. A sensor assembly for a LLL/TV camera is shown in FIG. 1. Light incident to a photocathode 11 of an image intensifier 12 causes an electron to be emitted for each proton of the incident light. A negative voltage on the photocathode 11 relative to a microchannel plate 13 establishes a force which accelerates the electrons in the region 14 between the photocathode 11 and the microchannel plate 13. These accelerated electrons dislodge a multiplicity of electrons on the multichannel plate 13 for each electron emitted from the photocathode 11 that strikes the multichannel plate 13. Thus multiplied the electrons are collected by a phosphor 15, which emits light with an intensity that is proportional to the number of collected electrons. This light is incident to a fiber optic window 16, and coupled by a fiber optic relay 17, to a focal plane array 18 of charged couple devices, whereat the image forming signals for display are established. A switch to a positive potential on the photocathode 11 relative to the microchannel plate 13 causes emitted electrons to remain at the photocathode 12. Deprived of electrons, light emissions from the phosphor 15 rapidly decrease in intensity until the light is extinguished, typically dropping to 5% of the peak intensity within a time interval measured in nanoseconds.

Light from the phosphor 15 is collected and integrated by the focal plane array 18 over all light emission intervals provided during a field or frame time. This integrated light creates the image forming signals which are used to establish the field or frame on the TV display. It should be apparent that the image intensifier 12 and focal plane array 18 combination performs exactly like a photographic camera, the photocathode 11 on the time establishing the exposure interval and the focal plane array in conjunction with the system display providing the developed image.

As previously stated an automatic light control for a LLL/TV system must have a dynamic range in the order of $10^9$-to-1, requiring a very short exposure time in a high light level environment and a very long exposure time in a low light level environment. Prior art pulse width modulated automatic light control systems, such as that disclosed in U.S. Pat. No. 4,202,014, cannot provide both short pulses to limit high intensity light and long pulses for gathering low intensity light. It is an object of this invention to provide such a capability. Since 200 volt excursions are required to gate the photocathode of an image intensifier on and off and the load capacitance of the photocathode is in the order of 25 pf, significantly different circuits are required for providing the short and long pulses. To eliminate such diverse circuitry the system of this invention controls the exposure at high light levels with pulses having widths in the order of 100 nanoseconds, utilizing a number of such pulses during a field or frame time to provide the required exposure. Thus, one pulse per frame reduces the sensitivity of the camera by a duty factor of $6 \times 10^{-6}$, providing 100 nanoseconds on time during a 16.6 miliseconds field time. At the lower light levels the photocathode is gated on during a field or frame time by a pulse having a width that is inversely proportional to the incident light. Only one such pulse is generated for each field or frame in a non-interleaved system.

Implementation of such a pulse light control system may introduce electromagnetic interference with the video. The leading edge of these pulses traverse 200 volts in 10 nanosecond, resulting in peak currents through the photocathode capacitance that are in the order of one ampere. This occurs within one inch of the focal plane array. To minimize such interference, the pulses are synchronized to the television line rate so that the interference occurs at the edge of the picture where it is not visible. As implemented, under high light level conditions, the system provides between 1 and 256 short pulses per a television field. The number of pulses is established by passing a constant rep rate pulse sequence through a gate that is open for a time determined by the incident light level.

Figure 2:
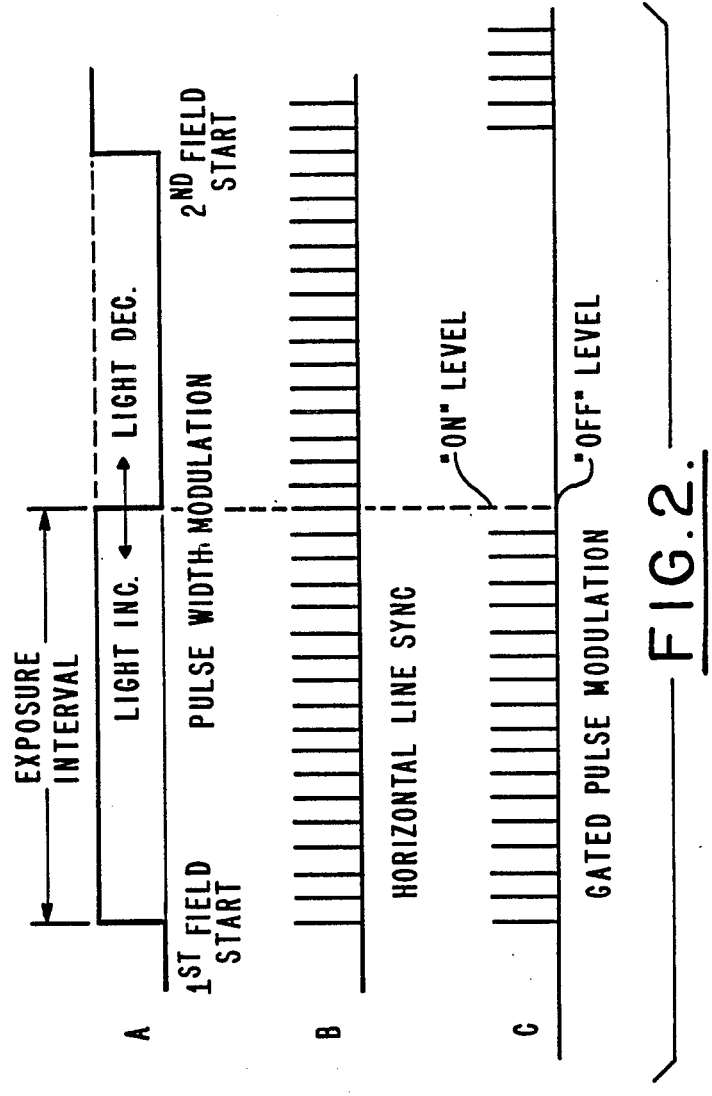
FIG. 2 is an illustration of exposure modulation wave forms utilized in the invention.

The two modes of exposure control are illustrated in FIG. 2. The first gate (A) illustrates pulsewidth modulation that is affective of a 30,000-to-1 dynamic range. When the exposure interval provided by this pulse decreases to a predetermined level, constant rep rate pulses synchronized with the horizontal lines (b) are initiated. These pulse are passed through a gate controlled by a pulsewidth modulated signal, which for purposes of illustration anf figure simplicity, is represented by the first gate (A), to provide gated pulses (C). If the width of the gated pulse that activates the constant rep rate pulses is 5 microseconds in a 16.6 milisecond field an exposure interval corresponding to 50 pulses each of 100 nanoseconds duration is provided. A reduction of the width of the gate pulse due to an increase in light level concomitantly decreases the number of 100 nanosecond pulses.

Figure 3:
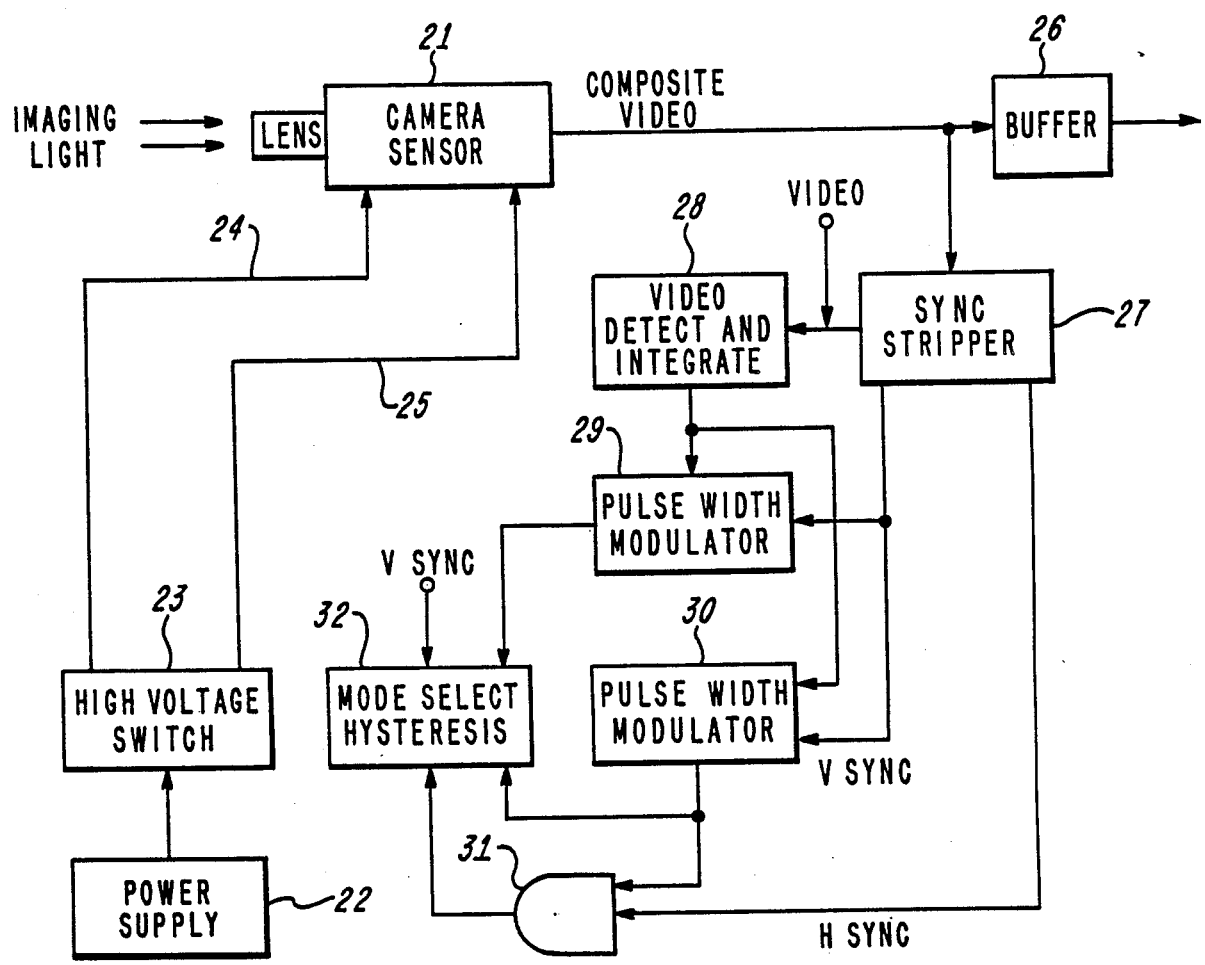
FIG. 3 is a block diagram of a preferred embodiment of the invention.

A block diagram of a system which provides the above described dual mode operation is shown in FIG. 3. The voltage to the photocathode of the image intensifier in a camera sensor 21 is coupled from a power supply 22 via a high voltage switch 23 and line 24, while the voltage to the microchannel plate is coupled from the switch via line 25. Composite video from the camera sensor is coupled via a buffer 26 to display or recording circuitry and to a sync stripper 27. Video from the sync stripper is coupled to a video detect and integrate circuit 28 wherefrom the integrated video is coupled to pulsewidth modulators 29 and 30, yet to be described, as is the vertical synch from the sync stripper 27. The horizontal sync from the sync stripper 27 and pulses from the pulsewidth modulator 30 are coupled to an AND gate 31, the output of which is coupled to a mode select switch with hysteresis 32. Also coupled to the mode select switch 32 are the output pulses from the pulse width modulator 29 AND 30 and vertical sync pulses from the sync stripper 27. Mode select switch 32 receives the pulses provided by the pulse modulators, selects the mode of operation, and couples a pulse or gated pulses, in accordance with the mode selected, to the high voltage switch 23. The selection is made on the basis of the width of the pulse provided by the pulse width modulators 29 and 30.

Figure 4:
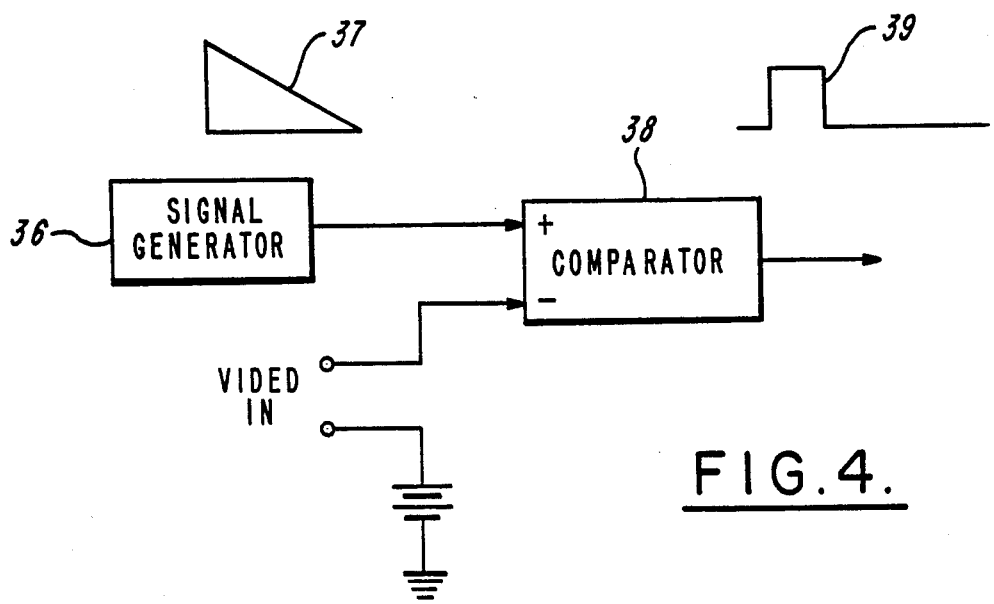
FIG. 4 is a schematic diagram of a pulse width modulator.

Refer now to FIG. 4, wherein a schematic of a pulse width modulator suitable for use as the pulse width modulators 29 and 30 is shown. A signal generator 36 provides a ramp with a negative slope 37 to the positive terminal of a comparator 38, the negative terminal of which is coupled to receive the sum of the integrated video from the video detect and integrate circuit 28 and a bias voltage selected in accordance with the pulse width range of the output signal desired, the higher the bias the shorter the pulse. The level of the ramp voltage is initially above the bias plus video and a high level signal appears at the output teminal thereof. When the ramp voltage falls below the bias plus video voltage, the comparator output goes through a transition from a high level to a low level to establish the pulse 39. It should be apparent that as the bias plus video level increases this pulse width 39 decreases.

Figure 5:
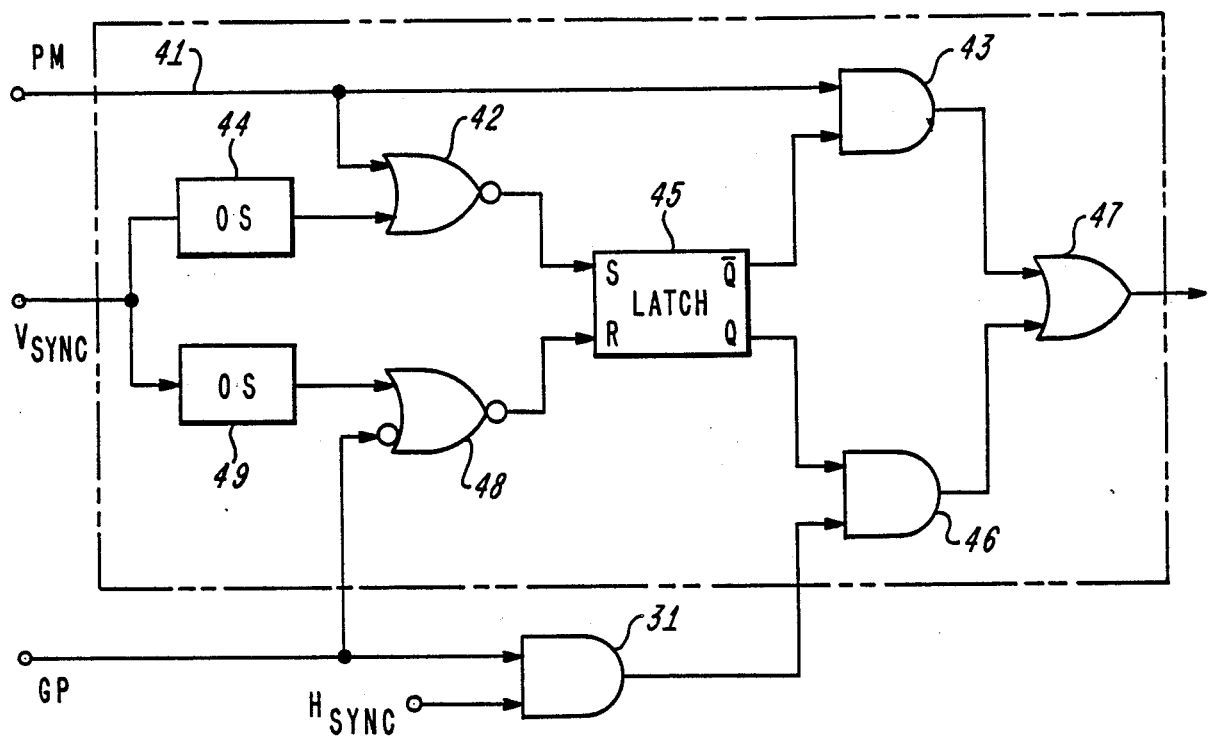
FIG. 5 is a schematic diagram of a mode select circuit that may be utilized in the embodiment of FIG. 3.

A circuit may be utilized to provide mode switching with hysteresis is shown in FIG. 5. This circuit may be configured to switch from the pulse modulated mode to the gated pulse mode when the video increases to a first selected level. To avoid excessive mode switching and erratic operation, at this switching level, a hysteresis is provided in the mode select switch 32 so that a switch back to the pulse modulated mode occurs at a second video level that is lower than the first selected level. At the first switching level, pulse width modulator 29 may, for example, establish a pulse having a 3 $\mu$sec width, while at the second video level pulse width modulator 30 may establish a pulse having a 12 msec width. The ratio of these switching pulse widths is not indicative of the ratio of the light levels that they represent. As stated previously, pulse widths provided by the pulse width modulators are functions of both the bias and video levels at the comparators in the pulse modulator circuit. A 12 msec switching time for the gate pulse from pulse modulator 30 may represent a light level of the same order of magnitude as that represented by a 3 $\mu$sec pulse from the pulse modulator 29. For purposes of the hysterisis switch 32 the 12 msec pulse is representative of a higher light level than is the 3 $\mu$sec pulse.

Figure 6:
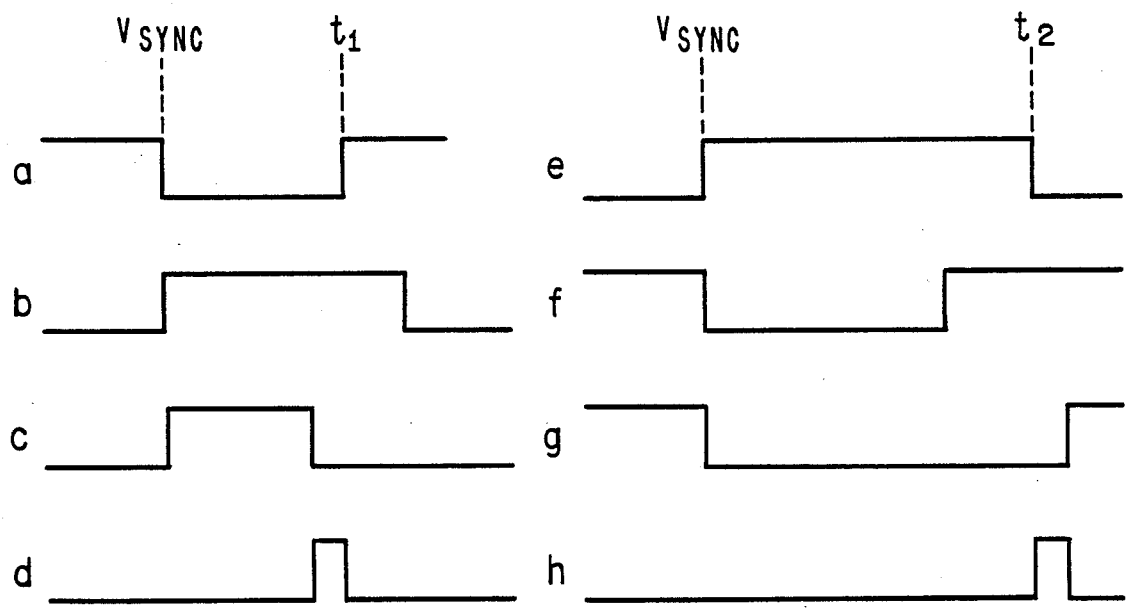
FIG. 6 is a series of wave forms useful for explaining the operation of the mode select circuit of FIG. 5.

Pulses from the pulse modulator 29, for the pulse modulated mode, are coupled via a line 41 to a NOR gate 42 and to and AND gate 43. A one shot 44, triggered by the vertical synch couples a negative going pulse of 3 $\mu$sec duration to the NOR gate 42 which provides a low level signal at the output terminal thereof for all combinations of signal at the two inputs other than two level signals. Wave form (a) in FIG. 6 represents a negative going pulse from one shot 44 terminating at 3 $\mu$sec represented as $t_1$ in the figure. When the pulse from pulse width modulator 29 has a width that exceeds $t_1$, as shown by the wave from (b), the signal coupled from NOR gate 42 to the R terminal of a S-R latch 45 is always at a low level, the two wave forms never being at a low level simultaneously. Latch 45 provides a low level signal at the Q terminal when the signal at the S input terminal is low and the signal at the R input terminal is high, and a high level signal at the Q-not terminal S is high and R is low. When a transition occurs at either the S or R input terminals that couples a low level signal to both input terminals, the signal levels at Q and Q-not maintain the level that existed prior to the transition.

Consider the camera to be operating in the pulse modulated mode and that a high level signal appears at the Q-not terminal of the latch 45, coupling a high level signal to AND gate 43 and a low level signal from the Q terminal to AND gate 46. The output signals of AND gates 43 and 46 are coupled to an OR gate 47. Consequently, for the condition decribed, the pulses from the pulse width modulator 29 are coupled through AND gate 43 and OR gate 47 to the high voltage switch 23. When the video level has increased to a level that provides a pulse that is video level has increased to a level that provides a pulse that is less than $t_1$, as represented by the signal (c), the two signals (a) and (c) are simultaneously at a low level for a time interval equal to the time difference between the terminations of the pulse from pulse width modulator 29 and $t_1$, giving rise to a pulse at the output terminal of NOR gate 42 that is represented at (d). As will be explained, a low level signal exists at the R terminal. Consequently, the transition from low to high at the S terminal causes a low level signal to appear at the Q-not terminal and a high level signal to appear at the Q terminal. This condition remains when the pulse terminates and the input signal at the S terminal returns to a low level. The high level signal at the Q terminal permits pulses from AND gate 31 to be coupled through the AND gate 46 and therefrom through OR gate 47 to the high voltage switch 23. In this situation the low level signal at the AND gate 43 blocks the pulses from the pulse width modulator 29.

The vertical synch also triggers a one shot 49 which provides a positive pulse represented by the signal (e) for a duration of 12 msec represented as $t_2$. When the pulse from pulse width modulator 29 is less than 3 $\mu$sec, the pulse from pulse width modulator 30 is less than 12 msec. The pulse from pulse width modulator 30 is coupled to an inverting terminal at a NOR gate 48 while the positive going pulse from one shot 49 is coupled to a second terminal without inversion. After inversion the pulse from pulse width modulator 30 is a negative going pulse as represented by the signal (f). The signals (e) and (f) never achieve a low level simultaneously and the output of NOR remains at a low level. When the pulse from pulse width modulator 30 exceeds $t_2$ the resulting negative going pulse coupled to NOR gate 45, represented by signal (g), provides a simultaneous low level with the signal provided by the one shot 45. This establishes a pulse at the output terminal of NOR gate 48 that has a width determined by the time interval during which the two signals (e) and (g) are simultaneously zero. The output terminal of NOR 48 is coupled to the R terminal of the latch. Since a low level signal is coupled to the S terminal, this low to high transition causes a high level signal to be coupled to the Q-not terminal and a low level signal to be coupled to the Q terminal. Thus, the gated pulses from AND gate 31 are blocked and the pulses from pulse width modulator 29 are coupled through AND gate 43 and OR 47 to the high voltage switch 23, thereby re-establishing the pulse modulation mode. It should be recognized that the signals (d) and (h) are never high simultaneously.

While the invention has been described in its preferred embodiments, it is to be understood that the words which have been used are words of description rather than of limitation and that changes within the purview of the appended claims may be without departure from the true scope and spirit of the invention in its broader aspects.

I claim:

1. An automatic light control apparatus for a television camera utilizing an image intensifier photocathode as a high speed shutter comprising:
    means coupled to receive video signals from said television camera for providing a detected signal having a level representative of light levels at said television camera;
    pulse width modulator means coupled to receive said detected signal and responsive to vertical sync pulses from said television camera for providing first and second pulses of time durations which vary inversely with said level of said detected signal, said second pulse being of a longer duration than said first pulse;

means for generating a train of pulses to provide at least one pulse in said train during said time duration of said second pulse;

gate means coupled to receive said second pulse and said train of pulses for providing said at least one pulse for said time duration of said second pulse, thereby providing a gated train of pulses;

switch means coupled to receive said first and second pulses and said gated train of pulses for providing said gated train of pulses when said first pulse duration is shorter than a first predetermined time interval and for providing said first pulse when said second pulse duration is longer than a second predetermined time interval; and means coupled to said switch and said photocathode for gating said photocathode in accordance with pulses received from said switch means.

2. The automatic light control apparatus of claim 1 wherein said train of pulses is a train of horizontal sync pulses of said television camera.

3. The automatic light control apparatus of claim 1 wherein said first and second predetermined time intervals are representative of predetermined light levels, said first predetermined time interval being represented of a lower light level than said second predetermined time interval.

4. The automatic light control apparatus of claim 3 wherein said detected signal is representative of average light levels at said television camera and said first and second predetermined time intervals are representative of predetermined average light levels.

5. The automatic light control apparatus of claim 1 wherein said gate means is an AND gate.

6. The automatic light control apparatus of claim 1 wherein said photocathode gating means includes a high voltage power supply and a high voltage switch coupled between said high voltage power supply and said photocathode, said high voltage switch being responsive to pulse signals coupled from said switch means to gate said high voltage power supply, thereby gating said photocathode.

7. The light control apparatus of claim 1 wherein said pulse width modulator means includes:

signal generator means responsive to said vertical sync pulses for providing ramp signals having a negative slope;

bias means for providing predetermined bias voltages;

means for adding said detected signals to said bias voltages; and comparator means coupled to receive said ramp signals and said detected signal added to said bias voltages for providing pulses having time durations that vary inversely with levels of said detected signal.

8. The automatic light control apparatus of claim 1 wherein said switch means includes:

means responsive to said vertical sync pulses for providing a negative pulse having a time duration equal to said first predetermined time interval and a positive pulse having a time duration equal to said second predetermined time interval;

means coupled to receive said negative and said first pulse for providing a first signal when said time duration of said first pulse is shorter than said first predetermined time interval;

means coupled to receive said positive pulse and said second pulse for providing a second signal when said time duration of said second pulse exceeds said second predetermined time interval;

selection means coupled to receive said first pulse, said gated train of pulses, and said first and second signals for providing said gated train of pulses when said first signal is received and said first pulse when said second signal is received.

9. The automatic light control apparatus of claim 8 wherein said first signal means is a NOR gate and said second signal means is an NOR gate having an inverting input terminal coupled to receive said second pulse.

10. The automatic light control apparatus of claim 9 wherein said selection means includes a S-R latch coupled to receive said first signal at its S input terminal and said second signal at its R input terminal.

11. A method for automatically gating a photocathode of an image intensifier used as a high speed shutter in a television camera comprising the steps of:

receiving video signals from said television camera;

providing averaged signals representative of average light levels at said television camera from video signals received;

establishing first and second pulses of time durations which vary inversely with levels of said averaged signals, said second pulse being of a time duration longer than said first pulse;

generating a train of pulses at a repetition rate that provides at least one pulse within said time duration of said second pulse;

gating said train of pulses for a time interval equal to said time duration of said second pulse to obtain a gated train of pulses;

providing said gated train of pulses when said first pulse duration is shorter than a first predetermined time interval and said first pulse when said second pulse duration is longer than a second predetermined time interval; and gating said photocathode in accordance with signals provided by said providing step.

* * * * *